United States Statutory Invention Registration [19]

[11] Reg. Number: H696

Davidson [43] Published: Oct. 3, 1989

[54] SYSTEM FOR ACCESSING SHARED RESOURCE DEVICE BY INTELLIGENT USER DEVICES

[75] Inventor: Willard S. Davidson, Ramsey, Minn.

[73] Assignee: CPT Corporation, Minneapolis, Minn.

[21] Appl. No.: 96,278

[22] Filed: Sep. 10, 1987

Related U.S. Application Data

[63] Continuation of Ser. No. 627,001, Jul. 3, 1984, abandoned.

[51] Int. Cl.[4] ..... G06F 1/00; H04J 3/17; G05B 23/02

[52] U.S. Cl. ..... 364/900; 364/200; 370/80; 370/95.2; 340/825.08

[58] Field of Search ..... 340/825.08, 825.5, 825.52; 370/60, 80, 94, 96; 364/200 MS File, 900 MS File

[56] References Cited

U.S. PATENT DOCUMENTS

| | | | |
|---|---|---|---|
| 4,034,346 | 7/1977 | Hostein | 364/200 |
| 4,047,159 | 9/1977 | Boudry | 364/200 |
| 4,168,469 | 9/1979 | Parikh et al. | 364/900 |
| 4,271,507 | 6/1981 | Gable et al. | 370/94 |
| 4,377,843 | 3/1983 | Garringer et al. | 364/200 |
| 4,388,683 | 6/1983 | Beifuss et al. | 364/200 |
| 4,459,589 | 7/1984 | Ito | 340/825.52 |
| 4,485,439 | 11/1984 | Rothstein | 364/200 |
| 4,509,140 | 4/1985 | Cheung | 364/900 |
| 4,527,235 | 7/1985 | Chebra | 364/200 |
| 4,547,880 | 10/1985 | DeVita et al. | 370/96 X |
| 4,633,245 | 12/1986 | Blount et al. | 340/825.03 |
| 4,667,321 | 5/1987 | Goodman | 370/80 |

FOREIGN PATENT DOCUMENTS 0104542 4/1984 European Pat. Off. .

OTHER PUBLICATIONS

Stockwell, "Serial Link Communication Module for Local Work Station Attachments", IBM TDB, vol. 6, No. 6, Nov. 1983, pp. 2817–2819.

N. D. Mackintosh: "Interrogation Tells μp Which Boards Are Present", EDN Magazine, vol. 26, (1981), Feb.

*Primary Examiner*—Stephen C. Buczinski
*Assistant Examiner*—Linda J. Wallace
*Attorney, Agent, or Firm*—Merchant, Gould, Smith, Edell, Welter & Schmidt

[57] ABSTRACT

A shared resource system (20) is disclosed wherein multiple user devices (24) share a resource device such as a disk drive (36). The multiple user devices (24) are interconnected to the resource device by high speed synchronous serial data links (26). Each of the user devices (24) include a serial to parallel/parallel to serial converter means (22) for converting and transmitting on the high speed synchronous serial data links (26) user device requests to access the resource device. The resource device includes a serial to parallel/parallel to serial converter means (30) for converting and transmitting such user device requests on a parallel data bus to the resource device. The resource device converter means (30) including multiple access ports (54) to enable multiple user devices (24) to access the resource device, the converter means (30) individually and periodically polling each of the access ports (54).

14 Claims, 9 Drawing Sheets

Microfiche Appendix Included
(3 Microfiche, 139 Pages)

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

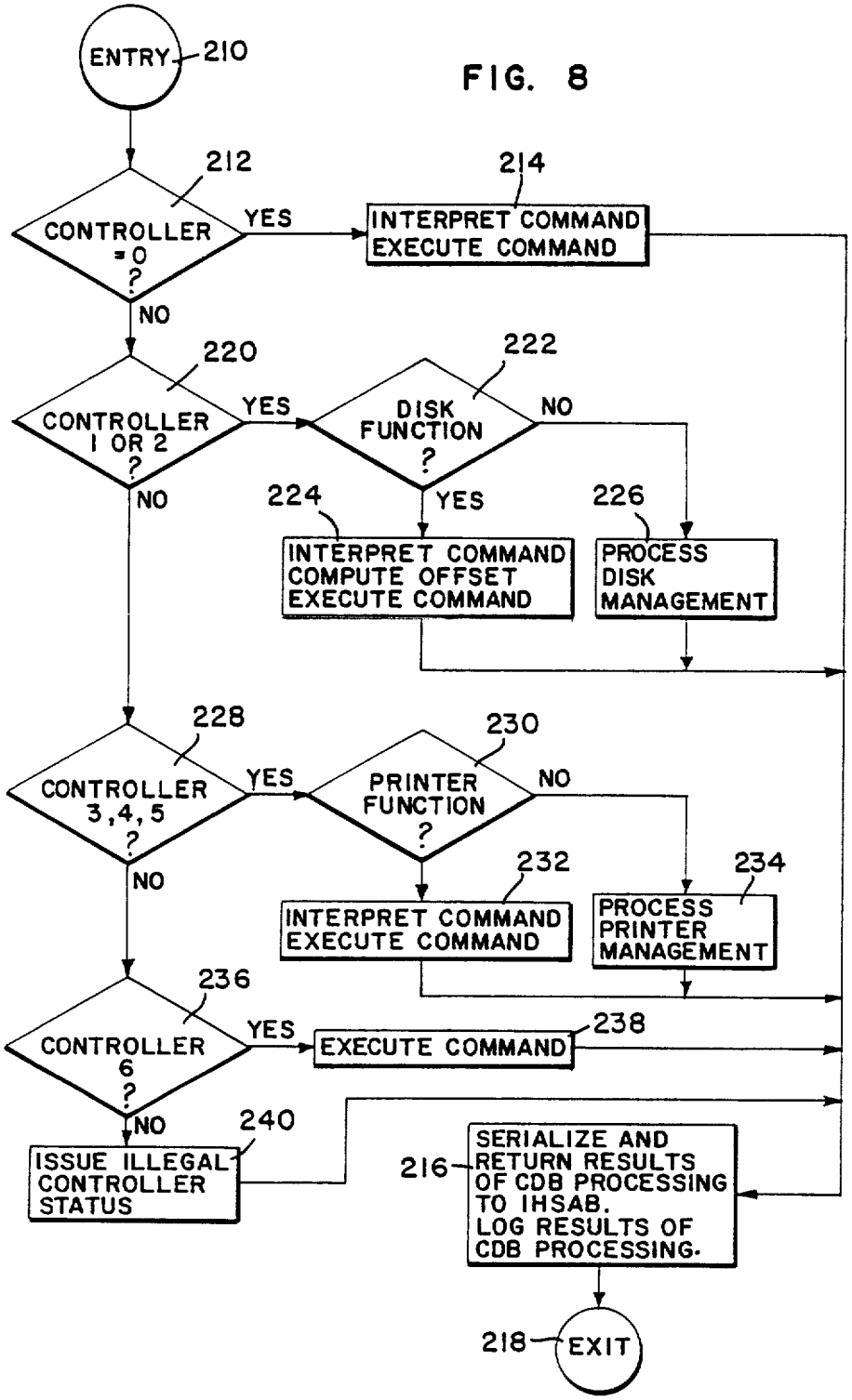
ENTRY
210
FIG. 8
212
CONTROLLER = 0 ?
YES
214
INTERPRET COMMAND
EXECUTE COMMAND
NO
220
CONTROLLER 1 OR 2 ?
YES
222
DISK FUNCTION ?
NO
NO
224
YES
226
INTERPRET COMMAND
COMPUTE OFFSET
EXECUTE COMMAND
PROCESS DISK MANAGEMENT
228
CONTROLLER 3,4,5 ?
YES
230
PRINTER FUNCTION ?
NO
NO
232
234
INTERPRET COMMAND
EXECUTE COMMAND
PROCESS PRINTER MANAGEMENT
236
CONTROLLER 6 ?
YES
EXECUTE COMMAND
238
NO
240
ISSUE ILLEGAL CONTROLLER STATUS
216
SERIALIZE AND RETURN RESULTS OF CDB PROCESSING TO IHSAB.
LOG RESULTS OF CDB PROCESSING.
218
EXIT

SYSTEM FOR ACCESSING SHARED RESOURCE DEVICE BY INTELLIGENT USER DEVICES

CROSS REFERENCE TO RELATED APPLICATION

This application is a continuation of applicant's copending application Ser. No. 627,001, filed July 3, 1984, now abandoned.

MICROFICHE APPENDIX CROSS-REFERENCE

This application includes a Microfiche Appendix of three fiche and a total of 139 frames.

BACKGROUND OF THE INVENTION

The present invention relates to an intelligent shared resource system for word processing and data processing systems. More particularly, the present invention relates to an intelligent shared resource system for enabling multiple word processing and data processing systems to share remote high performance/speed peripheral devices wherein the intelligence for making requests is retained at the word processing and data processing systems.

Many systems and approaches have been developed to enable distributed word processing and data processing and sharing of resources such as disk drives and printers within the systems. Most attempts at integrating the various elements of word processing and data processing systems have involved the use of local area networks wherein some degree of the operational intelligence is removed from the individual user stations to the various controllers for the high performance resources which are being shared by the network. This is done to free up the network lines so other users can access the network. In such an approach, the user typically indicates that it wants to access a particular resource, the controller at the resource largely performing all of the necessary commands to enable operation including file management and formation of the actual requests of the resource. Accordingly, while the controller is performing these commands the network is available for other users to access the resource or other resources within the system. This approach is particularly suited for use with resource devices or peripherals which have performance/response characteristics which are less than that of the host computers of the user devices or where the interface transfer of data is relatively slow, wherein use thereof requires a substantial amount of system time in terms of word processing and data processing system environments.

Most conventional approaches to distributive processing and resource sharing are relatively expensive and complicated in their implementation due to the additional intelligence and relocation of intelligence required to properly operate the network. Substantial overhead functions are required to coordinate and operate the local network. Each user device typically requires some additional logic or intelligence for determining when the network is available for accessing and the transfer of data. Complicated priority schemes are often required to make sure that certain users are not prevented from accessing the resources.

Most of these approaches for sharing resources are built around the concept that the resource or peripheral device has lesser response/performance characteristics than the user device's host computer. However, these rather complicated network approaches are not necessitated where the host computer of the user device has lesser response/performance characteristics than the resource being accessed. For example, eight bit microcomputers often found in word processing and data processing systems are not as fast or responsive as many hard disk storage devices commonly in use. A simple, relatively inexpensive approach is needed to allow multiple ones of those microcomputers to share a high performance resource such as a hard disk.

The present invention solves these and many other problems associated with existing shared resource systems by, in part, using a much simpler approach for sharing high performance resources.

SUMMARY OF THE INVENTION

The present invention relates to a shared resource system for enabling multiple user devices such as word processing and data processing terminals to share a remote high performance peripheral device such as a fixed disk drive. The shared resource system includes a high speed serial synchronous data link interconnecting the user devices to the high performance peripheral device. Associated with each of the user devices is an intelligent high speed adaptor board for transmitting requests independently originated at each of the user devices on the serial synchronous data link. A system controller board is associated with the high performance peripheral devices of the shared resource system for receipt and processing of the requests so transmitted on the high speed synchronous data link from the intelligent high speed adaptor board. The system controller board includes a plurality of ports enabling interconnection of a plurality of the user devices and their associated intelligent high speed adaptor board to the system controller board. The system controller board means further includes for periodically polling each of the ports to ascertain if the user device associated with the respective port being polled has any requests. The system controller board further includes for transmitting on the high speed serial synchronous data link the results of operations performed at the high performance peripheral devices as a result of requests received from the user devices. The intelligent high speed adaptor board includes for receiving the results received on the high speed serial synchronous data link from the system control board and transmitting the same to its associated user device means, whereby multiple user devices can operate with the shared high performance peripheral devices of the shared resource system without substantial modifications.

The present invention is particularly advantageous in that it allows sharing of high performance peripheral devices by user systems in a relatively straight forward and efficient manner. Much of the intelligence required to communicate with the high performance peripheral devices is retained by the user devices, the user transferring the commands required to access the high performance peripheral devices as well as the raw data to be operated on. The host computer of the user device constructs a command description block (CDB) which defines a command to be processed at the shared resources. The CDB format follows generally that of the American National Standards Institute (ANSI) Small Computer System Interface (SCSI) standard for the control of intelligent peripheral devices. Additional CDB's are implemented in the present invention to provide management functions and allow portions of shared storage to be reserved for an individual user device. The CDB's are independently originated at the user devices, and sent to the intelligent high speed adaptor board apparatus along with the raw data to be operated on and a designation of the resource device being accessed. The intelligent high speed adaptor board apparatus formats a CDB data frame including an identifier of the resource device accessed and transmits the CDB data frame in response to periodic polls from the system controller board. In the preferred embodiment each user device's intelligent high speed adaptor board apparatus has equal priority with one command at a time being tranferred. A Cyclic Redundancy Check (CRC) is performed on each transmission to assure no errors have occurred during the data transmission.

The present invention is particularly suited for use with fast peripheral devices by user devices having relatively slow host computers. For example, many word processing devices utilize an eight bit central processing unit (CPU) such as a Z80 microprocessor made by Zilog, Inc. Many hard disk systems, such as the commonly available Winchester disk drives offer performance which exceeds that of the eight bit microprocessor. The high speed serial synchronous data link interconnecting the fast peripheral devices to the relatively low performance user systems enables rapid communication therebetween such that no appreciable delay or degradation of the high speed peripheral device performance is noticed by the low performance user system. Accordingly, the peripheral device can service several low performance user devices.

The shared resource system, which includes two parallel to serial converter devices (the intelligent high speed adaptor board apparatus and system controller board apparatus) interconnected by a high speed serial synchronous data link and appropriate management commands, provides for conversion from a parallel interface at the user system to a high speed serial interface and for conversion from the high speed serial interface to a parallel interface at the shared high performance peripheral devices. Furthermore, this conversion occurs without requiring any special formatting or operations to be performed by the user device. The practical benefit is that the user device thinks for all practical purposes that it is operating in a low performance environment via a parallel data bus. The shared high performance peripheral devices operate as though they are in a high performance environment. Accordingly, each system is transparent with respect to the other.

Since the present invention is particularly suited for operation with high performance peripheral devices and controllers which are relatively fast compared to the low performance user system accessing them, a single high performance peripheral device or controller can service a number of low performance user systems without impacting the user systems performance and yet providing the benefit of shared resources.

Yet another advantage of the present invention is the provision for management and reservation of both private and shared portions of shared high performance mass storage devices and provision for reservation and use of high performance printers.

The shared resource system of the present invention provides a method and system for allocation of resources to multiple independent user devices which independently make requests of the shared resources. The shared resource system in the preferred embodiment has a master table for memory allocation of the shared storage devices to each of the access ports, the shared resource system keeping track of the access port being utilized at any given time, the shared resource system further providing management of the data transfer between the user devices and the shared resource. The user devices maintain control over file management and the controllers associated with the shared resources maintain control over the actual resource operation.

These and various other advantages and features of novelty which characterize the invention are pointed out with particularity in the claims annexed hereto and forming a part hereof. However, for a better understanding of the invention, its advantages, an objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views.

FIG. 8 is a flow diagram of the logic for processing a command descriptor block (CDB) by the system controller board embodiment shown in FIG. 3.

DETAILED DESCRIPTION OF THE PREFERRED EMBODIMENT

Figure 1:
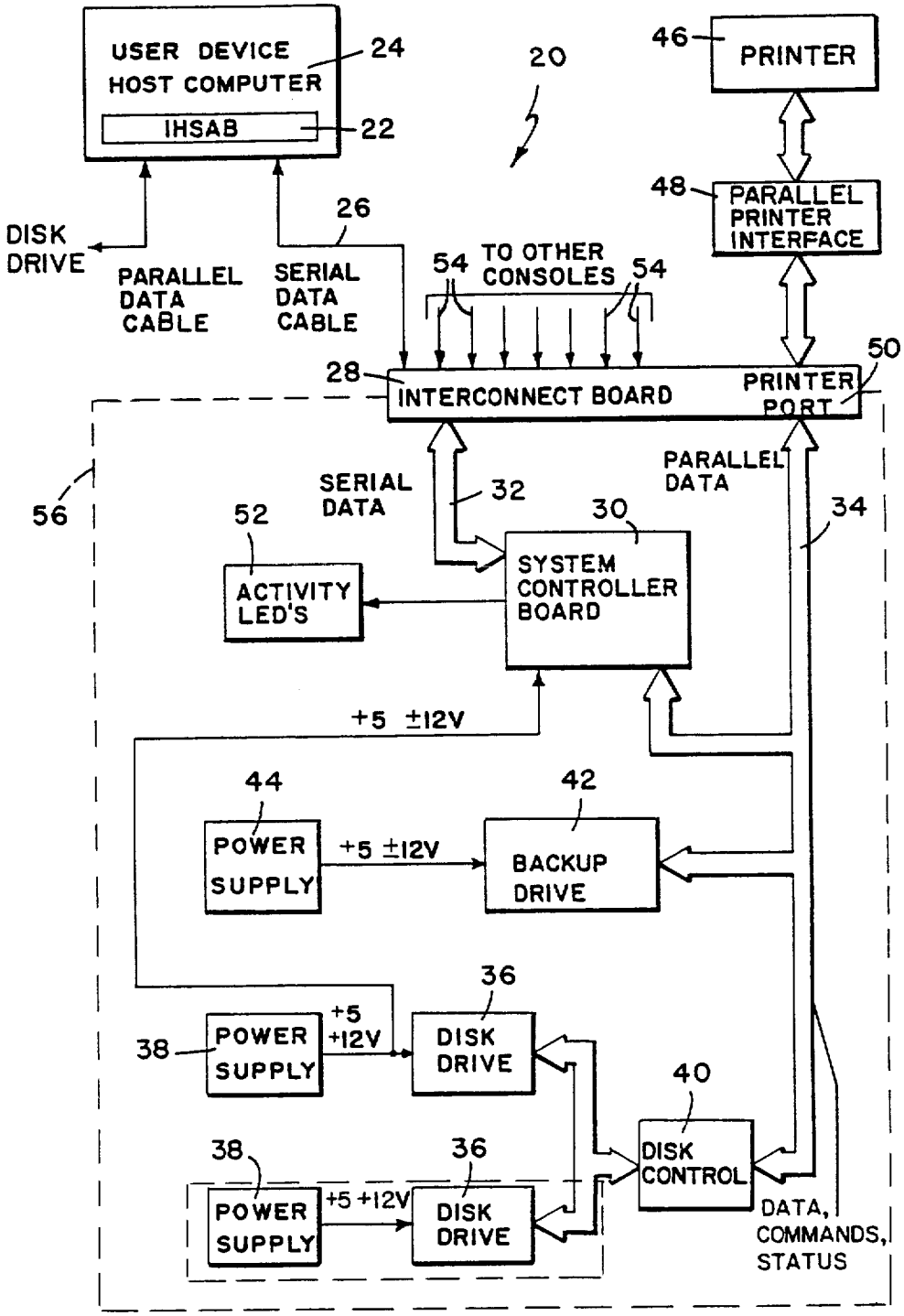
FIG. 1 is a system block diagram of an embodiment of the shared resource system of the present invention.

Referring now to the drawings, there is shown in FIG. 1 a block diagram of a preferred embodiment of the shared resource system of the present invention; the shared resource system being generally designated by the reference numeral 20. It will be appreciated that the present invention has particular application to word processing systems as well as data processing systems which have performance/response characteristics which are less than that of the shared high performance peripheral devices. As illustrated, the shared resource system 20 includes an intelligent high speed adaptor board (IHSAB) apparatus 22 associated with the host computer of each low performance user device 24 which, for example, might be a CPT Corporation word processor of the 8500, 8515, 8525, or 8100 series. The intelligent high speed adaptor board apparatus 22 using conventional methods converts the parallel data format of the user device 24 requests to a serial data format for transmission on a high speed serial synchronous data link 26 interconnecting the intelligent high speed adaptor board 22 to an interconnect board 28 which in turn is connected to a system controller board (SCB) apparatus 30 via a serial interconnection 32. The system controller board apparatus 30 processes the serial data transmission and converts the same to a parallel data format for transmission on a parallel data link to the controllers of appropriate peripheral devices if required. In the embodiment shown, the system controller board is interconnected via a parallel data link 34 with one or two hard disk drives 36 (such as of the Winchester type although other types might be utilized), their respective power supplies 38, a hard disk controller 40, and a cartridge removable media backup disk drive 42 and its associated power supply 44. Further, the system controller board 30 is shown as being interconnected to a printer 46 and its associated parallel printer interface control 48 via a printer port 50 on the interconnect board 28. Various light emitting diodes (LEDs) 52 might be associated with the system controller board 30 for displaying the status of the same. The interconnect board 28 shown includes a total of eight ports 54 which enables eight intelligent high speed adaptor boards 22 at different low performance user devices such as word processor consoles to communicate with the system controller board 30 and share its associated high performance peripheral devices or resources. In the preferred embodiment the interconnect board 28, the system controller board 30 and the associated disk systems are mounted within a housing 56, the interconnect board 28 providing access to and from devices outside of the housing 56.

The intelligent high speed adaptor board 22 receives command descriptor block requests (CDB) and data from the low performance user device 24 via the user device's internal parallel data bus structure. The intelligent high speed adaptor board 22 converts the parallel data to serial data using conventional parallel to serial conversion techniques and protocol chips for high speed transfer of the data on the high speed serial synchronous data link 26; for example, an RS-422 data link capable of operating at one megabit per second. Communications between the intelligent high speed adaptor board 22 and the system controller board 30 might use a modified form of the Synchronous Data Link Control (SDLC) or X.25 protocol along with differential line drivers and receivers. The system controller board 30 processes the high speed serial data received via the data link 26 and converts the same, if necessary, to a parallel data protocol such as Shugart Associates System Interface (SASI) or the draft American National Standard Small Computer System Interface (SCSI) using conventional serial to parallel conversion techniques and protocol chips. The modified SDLC-like protocol will include a frame check sequence, the preferred embodiment utilizing the conventional Cyclic Redundancy Check, with each serial transmission to ensure integrity of the data transferred The receiving device, either the intelligent high speed adaptor board 22 or the system controller board 30 will preferably detect data errors and attempt to recover from such errors.

As illustrated in the embodiment shown in FIG. 1, up to eight low performance user devices 24 may by interconnected to the system controller board 30. The system controller board 30 individually polls each of the intelligent high speed adaptor boards 22 associated with each of the ports 54 by periodically sending a poll frame to the intelligent high speed adaptor boards 22. Two types of polls which are transmitted to or from the system controller board 30 are maintenance polls which perform no direct data transfer or shared resource maintenance function and non-maintenance polls which cause a data or information transfer within the system. Polls transmitted by the system controller board include: (1) are you there maintenance poll; (2) system busy maintenance poll; and (3) command descriptor block (CDB) non-maintenance poll.

The system controller board 30 sequentially transmits a CDB poll to each of the user devices indicating it is ready to perform data transfer on the serial interface between the intelligent high speed adaptor board 22 of the user device polled and the system controller board 30. The system controller board 30 waits a predetermined amount of time at each of the ports for a response to the CDB poll. If no response is received, the system controller board 30 moves on to the next port. After a predetermined number of CDB polls at a given port without any response, system controller board 30 transmits a maintenance (are you there) poll which requires acknowledgement from the intelligent high speed adaptor board 22 to which it is sent. If the intelligent high speed adaptor board 22 does not send a response indicating its presence, all resources reserved to the respective user device 24 are canceled.

The busy poll is transmitted when the system controller board 30 is busy processing a command and is unable to process a second command or data transfer from the intelligent high speed adaptor board 22. Upon receipt of the system busy poll, the intelligent high speed adaptor board 22 will refrain from transmitting any commands or data transfer requests.

In response to the CDB poll, the intelligent high speed adaptor board 22 will transmit to the system controller board 30 a CDB data frame with the complete CDB command and raw data, received from the user device, which is necessary to perform a required operation at the system controller board 30 and/or its associated high performance peripheral devices if any such operation is to be performed.

The CDB data frame which is sent includes the following fields: (1) frame type; (2) controller; (3) reserved; (4) command descriptor block (CDB) command. The frame type field is a one byte field identifying transmission as a CDB data frame transmission. The controller field identifies the targeted controller or logical high performance peripheral device of the shared resources for which the data frame is intended and accordingly affects how the CDB is processed. In one embodiment of the present invention the controller field might have the following values: 0=private storage; 1=shared storage; 2=removable media; 3,4,5=printer; 6=diagnostics. The reserved field is four bytes long and is reserved for future use and expansion. The CDB command is a six byte field which completely defines a command to be processed by the system controller board 30 and/or the targeted peripheral device controller. The first byte of the CDB identifies the particular command or data frame being transmitted. Immediately following this frame, the intelligent high speed adaptor board 22 will transmit the raw data if any is to be sent.

As previously indicated the CDB command is originated at the host computer of the user device and is generally formed in accordance with the ANSI SCSI standards for the control of intelligent peripheral devices. Additional CDB commands are defined to enable management functions to be implemented, reservations of shared memory by the individual user devices, reservation of printed devices for use by the individual user devices, etc. The following are a list of various CDB commands implemented in one embodiment of the invention:

| Command | Function |
|---|---|
| Test Drive Ready | Verifies that the shared resource system is ready to accept commands for the selected resource device. |
| Request Sense Status | Requests additional information (sense status) regarding the type and possible cause of an error in a previous command. |
| Read | Requests information transfer through the user device. |
| Write | Requests information transfer through the shared resource. |
| Reserve Device | Requests reservation of a logical device for exclusive use of one of the user devices. |
| Release Device | Requests release of a previously reserved logical device. |
| Directory Corrupt | Requests message exchange as to status of the user device directories. |
| Directory Corrupt Inquiry | Verifies integrity of the shared device directory. |
| Statistics | Requests the overall status of the shared resource system. |
| Backup Section | Requests backup of an image of a disk section through the backup device. |
| Restore Section | Requests transfer of an image from the backup device. |
| Priority Read | Requests transfer of one sector (256 bytes) of information to user device regardless of reserved status. |
| Read Sense Switches | Requests the value of sense switches installed on the intelligent high speed adaptor board. |
| Sense Port Number | Requests the port number to which the user device is physically connected. |

The following are printer commands which might be implemented in an embodiment of the present invention:

| Command | Function |
|---|---|
| Test Drive Ready | Verifies that the shared resource system is ready to accept commands for the selected device. |
| Request Sense Status | Requests additional information (sense status) regarding the type and possible cause of an error in a previous command. |
| Write Printer Buffer | Requests information transfer from the user device to the shared resource system. |
| Reserve Device | Requests reservation of a logical printer device for exclusive use of one user device. |
| Release Device | Requests release of a previously reserved printer device. |
| Send Immediate | Requests information transfer through the printer device data port. |

-continued

| Command | Function |
|---|---|
| Printer Control | Requests user device control of the printer interface buffer and buffer management. |

A data results frame is sent to the intelligent high speed adaptor board 22 by the system controller board 30 after completing processing of a command descriptor block (CDB) data frame. The results frame includes the following fields: (1) type; (2) controller; (3) reserved area; (4) command descriptor block (CDB); (5) status; (6) message; (7) sense; (8) reserved area; (9) raw data (up to 8k bytes) if necessary. The first four fields are the same as the CDB data frame. The status field, which indicates if any errors have occurred and the nature of such errors, is one byte long and is automatically transmitted at the conclusion of all commands that have selected disk devices. The message field is one byte long and includes information for diagnostic purposes. The sense field is a four byte field which includes further status information which is transmitted by the system controller board 30 in response to a CDB data frame requesting additional sense status such as when an error was determined in a previous command. In response to a CDB data frame requesting additional status information, the system controller board 30 will return the four data bytes of the sense field followed by a normal command completion status and message byte. In the preferred embodiment the content of the data bytes is different for printer and disk peripheral devices and has the following definitions:

Disk Device Data Format (similar to that returned by a hard disk controller)

Byte 1: Sense Key
Byte 2: High Address
Byte 3: Address
Byte 4: Low Address

Printer Device Data Format

Byte 1: Number of Byte in Print Buffer (high)
Byte 2: Number of Bytes in Print Buffer (low)
Byte 3: Printer Status Word
Byte 4: Sense Key In addition to the responses generated by hard disk controllers, the system controller board 30 might implement additional sense key values or status information. Wherever possible or practical, in the preferred embodiment these keys follow the form of draft ANSI small computer system interface. The sense key codes include the following:

0=No Error

This key is returned whenever the request sense status CDB data frame is issued and no error has occurred.

11=Uncorrectable Error

The addressed data block contains an uncorrectable data error. The data contained in that sector cannot be read by the system.

20=Invalid Command

This key is returned whenever the system controller board is unable to recognize the previous command.

7=Data Protect

The previous command attempted to perform an operation on the selected device that was rejected due to the fact that the device had been reserved by another user.

05=Not Selected

The printer cannot be selected by the printer controller.

22=Buffer Full

This is issued whenever the printer controller buffer has overflowed.

40=Directory Corrupt

A command has been issued by at least one other user to the selected peripheral device pertaining to the state of the directories held by the other users connected to the system.

As indicated, during normal operation the system controller board 30 will periodically poll each of the intelligent high speed adaptor boards 22 associated with the low performance user devices 24 by transmission of a CDB poll frame. Upon receipt of the CDB poll frame, the intelligent high speed adaptor board 22 will transmit a command descriptor block (CDB) data frame either performing a management function or transmitting data to or requesting data from the system controller board 30 if the low performance user device 24 has any such request or transmission. The intelligent high speed adaptor board 22 will then wait until the results frame is received from the system controller board 30. The polling approach utilized is a single thread system wherein only one task is active at any particular time. Accordingly, the system controller board 30 will respond to the CDB data frame before polling the next user device 24. If for some reason the results frame is garbled, the system controller board 30 will subsequently send another (CDB) poll frame and the intelligent high speed adaptor board will retransmit the command descriptor block (CDB) data frame. Similarily, the system controller board 30 will subsequently send another CDB poll frame after having polled the other ports 54 if either the original poll frame was garbled and not recognized by the intelligent high speed adaptor board 22 or the command descriptor block (CDB) data frame was garbled upon transmission to the system controller board 30 and the system controller board 30 did not recognize it as such.

The system controller board 30 will consecutively poll each of the user devices 24 by transmitting a CDB poll and wait an appropriate predetermined time for a response from the respective intelligent high speed adaptor board 22. If after a predetermined period of time there is no response, the system controller board 30 will poll the next port 54. After having polled a given user device 24 a predetermined number of times without receiving any response, the system controller board 30 will transmit a maintenance (are you there) poll and wait a predetermined period of time. If no response is received, the system controller board 30 will cancel all resource reservations or locks associated with the user device so resources are not allocated to an inactive system.

Figure 9:
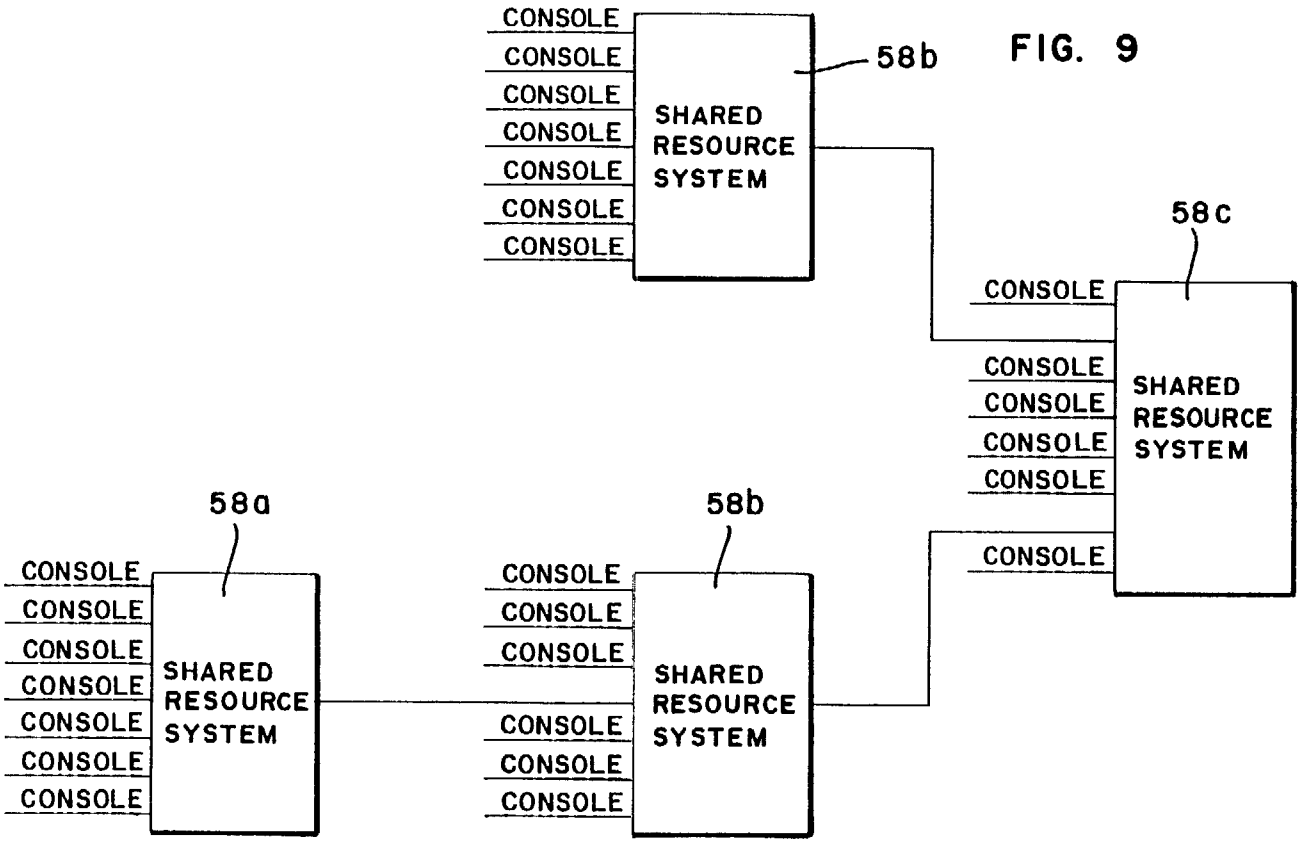
FIG. 9 is a block diagram of a networked configuration of multiple interconnected shared resource systems of the present invention.

As illustrated in FIG. 9, the system controller board 30 and its associated peripheral devices, the combination generally referred to as the shared resource system and being designated generally by the reference numeral 58, may be networked with other system controller boards 30 by dedicating one of the ports 54 to down line communications. As illustrated in FIG. 9, the system **58*c* polls the systems 58*b* which in turn mimics the behavior of an intelligent high speed adaptor board at one of the user devices. In addition, the system 58*b* polls the system 58*a* which also mimics the behavior of an intelligent high speed adaptor board. It will be appreciated, that the console or user devices 24 interconnected directly to the system 58*c* will have more frequent access to the high performance peripheral devices associated with that system than the consoles or user devices 24 interconnected indirectly through to the systems 58*b* and 58*a*. Further, upline user devices 24 will not be able to dominate a dowline system so as to degrade access to the downline system by user devices 24** interconnected directly to the downline system.

Figure 2:
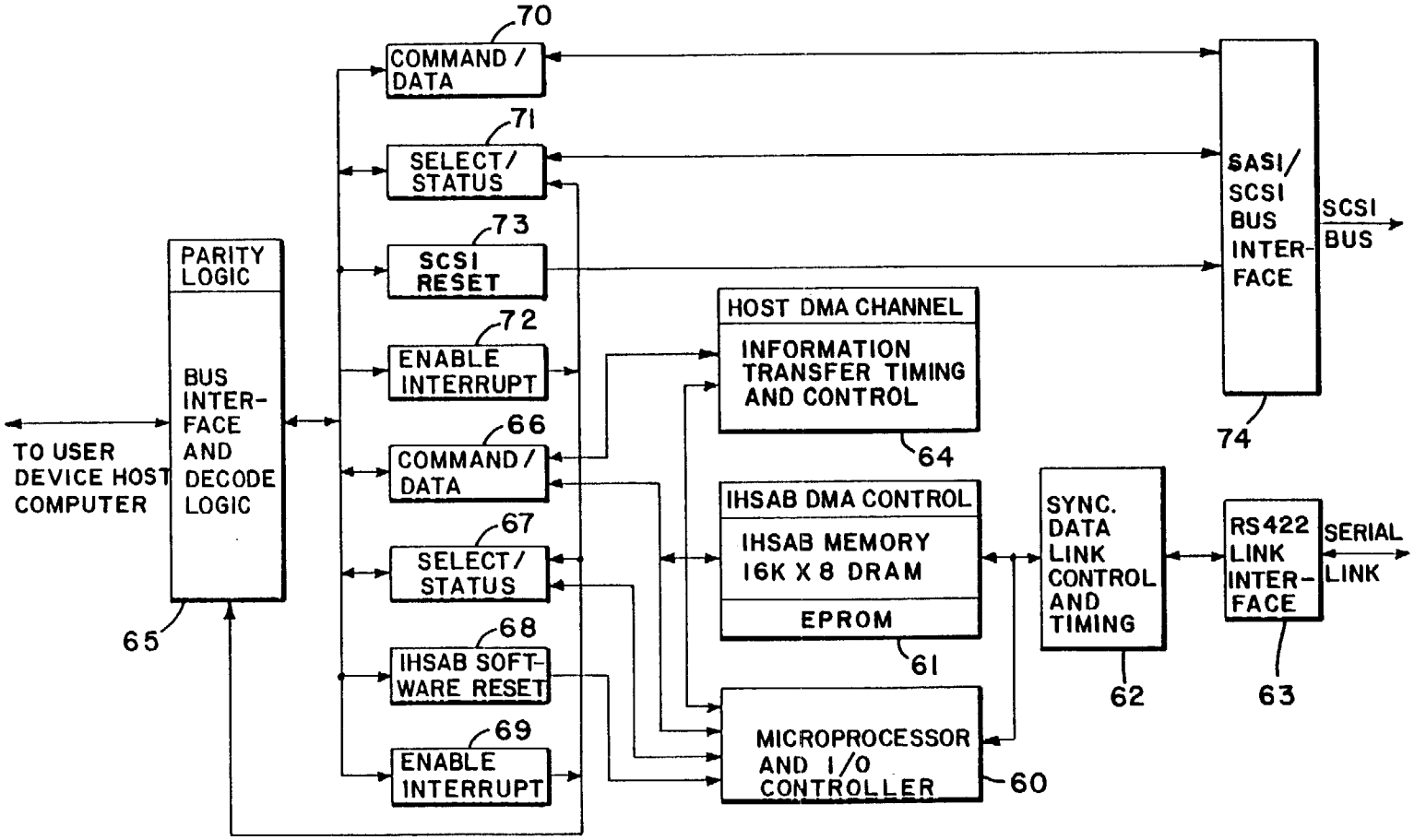
FIG. 2 is a block diagram of an embodiment of an intelligent high speed adaptor board of the embodiment shown in FIG. 1.

Illustrated in FIG. 2 is a system block diagram of an embodiment of the intelligent high speed adaptor board (IHSAB) 22. The intelligent high speed adaptor board 22 is based on a single board computer, which is controlled by a microprocessor 60. The microprocessor controls all data transfer, and peripheral control within the intelligent high speed adaptor board 22. The intelligent high speed adaptor board 22 has its basic software contained in an erasable, programmable read-only memory 61 and uses scratch dynamic RAM memory and a direct memory access controller to communicate with either the host computer of the user device 24 or serial data link 26. When communication to the serial data link 26 is desired, the microprocessor 60 establishes the DMA transfer parameters and block size, then issues an appropriate command to the synchronous data and control timing elements 62. These elements produce output which is translated into proper electrical levels for communication via the RS-422 link interface 63. When communication with the host computer of the user device 24 is required, a host direct memory access channel 64 is employed to transfer data from the internal scratch pad memory 61 to the host computer bus interface 65. This information may be transferred via several different logical paths with handshaking accomplished for commands and data via discrete logic circuitry 66. Additionally, the microcomputer 60 located on the intelligent high speed adaptor board may communicate with the host computer to exchange status and handshake information; such as controller designation, via a select status port 67. The host computer bus interface 65 may cause a software reset to occur on the intelligent high speed adaptor board 22 through manipulation of the software reset port 68. Additionally, the host bus interface 65 may enable or disable the generation of host interrupts via manipulation of logic in the interrupt enable/disable circuitry 69. In addition to the functions employed in the shared resource system, the intelligent high speed adaptor board 22 allows direct communication between host processors and local disk drives. The local connection of peripherals is accomplished in like manner to the communication provided by the intelligent high speed adaptor board 22 to the shared resource system. The command data logic 70, the status and select logic 71 and the interrupt enable logic 72 are functionally identical to their counterparts in the intelligent high speed adaptor board 22 used for serial communication (at 66, 67, 69). In a similar manner, the SCSI reset function at 73 is logically equivalent to the software reset provided at the software reset logic 68. The SCSI bus interface 74 provides a parallel data path to hard disk controllers that is logically very similar to that provided by the intelligent portion of the intelligent high speed adaptor board 22. In the preferred embodiment, the intelligent high speed adaptor board 22 will include switches to enable pre-reading of sequential sectors. For example, if the intelligent high speed adaptor board 22 was instructed to pre-read four sectors, every time a sector read request was made, the next four sectors would also be read. If a subsequent read request from the user device 24 was for one of the sectors pre-pread, the intelligent high speed adaptor 22 itself would transmit the sector information without any activity on the serial link required.

Figure 3:
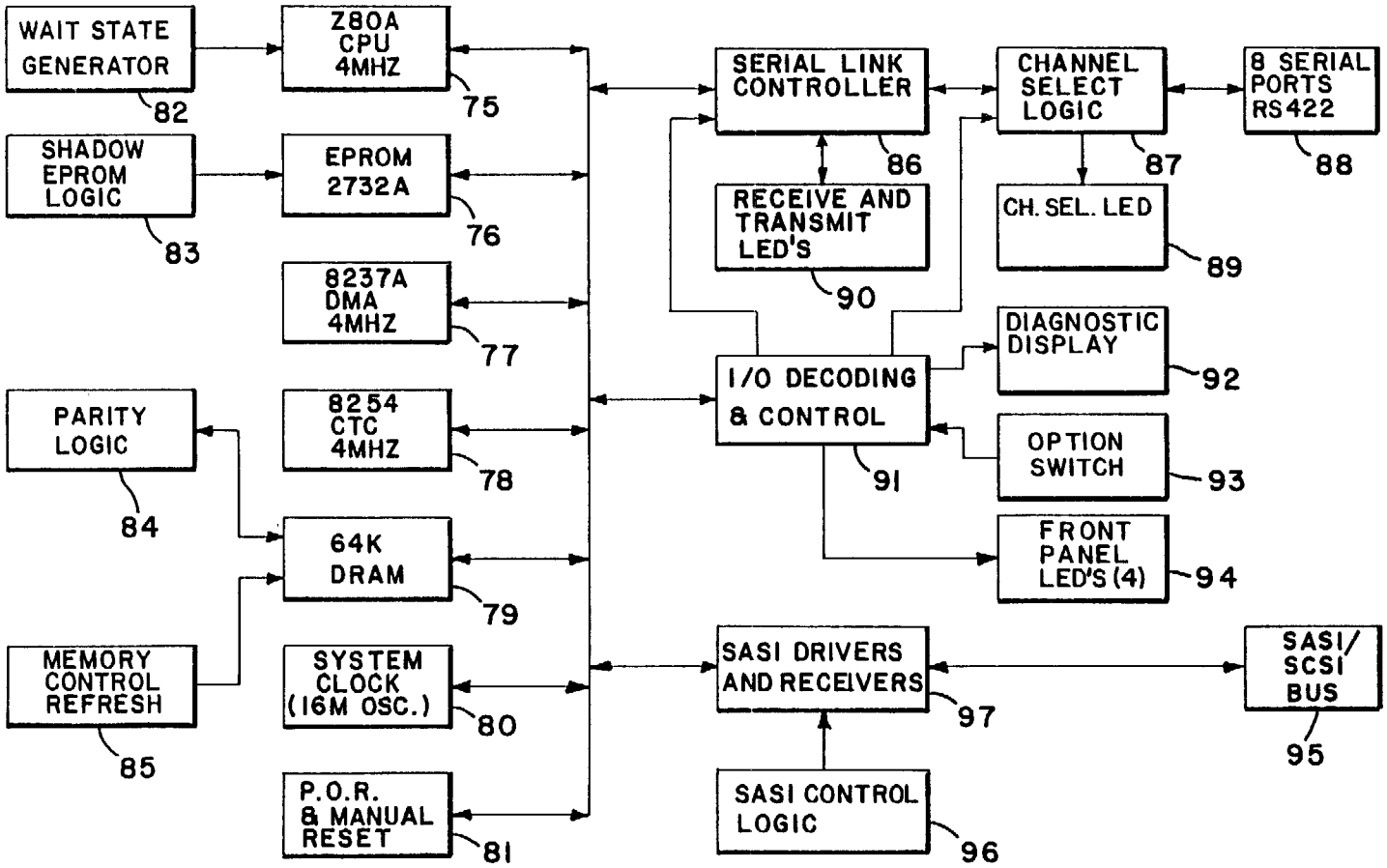
FIG. 3 is a block diagram of an embodiment of a system controller board of the embodiment shown in FIG. 1.

Illustrated in FIG. 3 is a system block diagram of an embodiment of the system controller board 30 in accordance with the principles of the present invention. The system controller board 30 is a more sophisticated version of the same computer employed in FIG. 2, the intelligent high speed adaptor board 22. The ability to control direct interface devices in addition to those accessed via the serial link has been deleted and the general capacity of the board has been increased. Logic elements 75 through 81 comprise a fairly standard single board computer. A Z80 central processing unit might be utilized. The internal structure is very similar to that employed in FIG. 2. Several areas have been expanded, including the size of main memory 79 and the capacity of the erasable read-only memory 76. The serial link controller 86 is identical to the serial link controller 62 of the intelligent high speed adaptor board 22. The channel select logic 87 and serial port interfaces 88 allow the system control board to select between up to 8 intelligent high speed adaptor boards. The channel select LED 89 indicates which channel is presently selected to aid in diagnostics and troubleshooting. The receive and transmit LEDs 90 provide a technician visible means of determining activity within the system control board. The I/O decoding and control circuitry 91 allows the direct memory access channel 77 and the microprocessor 75 to select and control various output and input devices within the system, including the diagnostic displays 92 and the option switches 93 which are both used to allow a user or technician to determine system activity and control some system parameters. Additionally, the option switches 93 are used to determine which of the eight serial ports 88 will be used as a remote downline connection if that option is installed in the system. The front panel LEDs 94 provide a user indication to system activity. The purpose of the system control board is to allow serial communication to mass storage devices. Those mass storage devices are connected via a SASI bus structure 95 and controlled by discrete logic elements 96 and line drivers and receivers 97.

Figure 4:
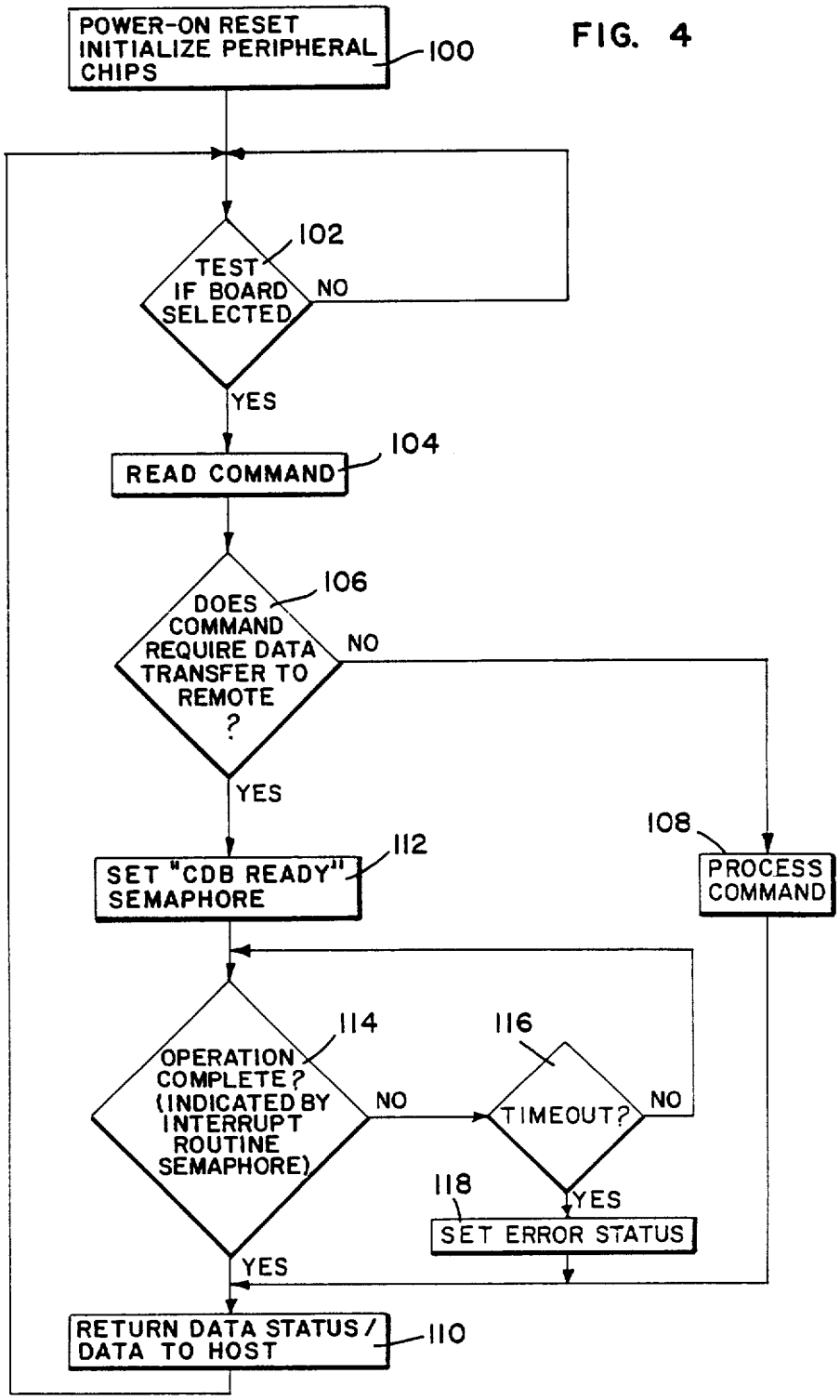
FIG. 4 is a flow diagram of the main logic loop of the intelligent high speed adaptor board embodiment shown in FIG. 2.

Illustrated in FIG. 4 is a logic flow diagram for an embodiment of the intelligent high speed adaptor board 22. At block 100, the system is powered on and the peripheral chips are initialized. A test is made at 102 to ascertain whether the intelligent high speed adaptor board has been selected by the user device 24. If the intelligent high speed adaptor board 22 has been selected, at 104 the CDB command transmitted by the user device 24 is interpreted. A check at 106 is performed to ascertain whether the command requires data transfer to the remote system controller board 30. If not, at 108 the command is processed and at 110 the status and data is returned to the host user device 24. For example, the user device 24 may inquire if the system controller board 30 is still polling the user device, the user device 24 may request the status of a previous transmission or the user device 24 may request the same data more than once. In each of these instances the intelligent high speed adaptor board 22 can handle the request internally without further transmission to the system controller board 30. If data is to be transferred to the system controller board 30, then the request is formatted as a command descriptor block (CDB) data frame and at 112 a flag is set indicating the command descriptor block (CDB) data frame is ready for transmission. At 114 a check is made to ascertain whether the command descriptor block (CDB) data frame has been transmitted and results received from the system controller board 30. If the operation has not been completed then at 116 a check is made to determine whether predetermined period of time has elapsed. If the predetermined period of time; for example, five to ten seconds has elapsed, an error status is set at 118 with the data and status returned to the host at 110. If in fact the operation has been completed the data and status is returned to the host user device 24 as indicated at 110.

Figure 5:
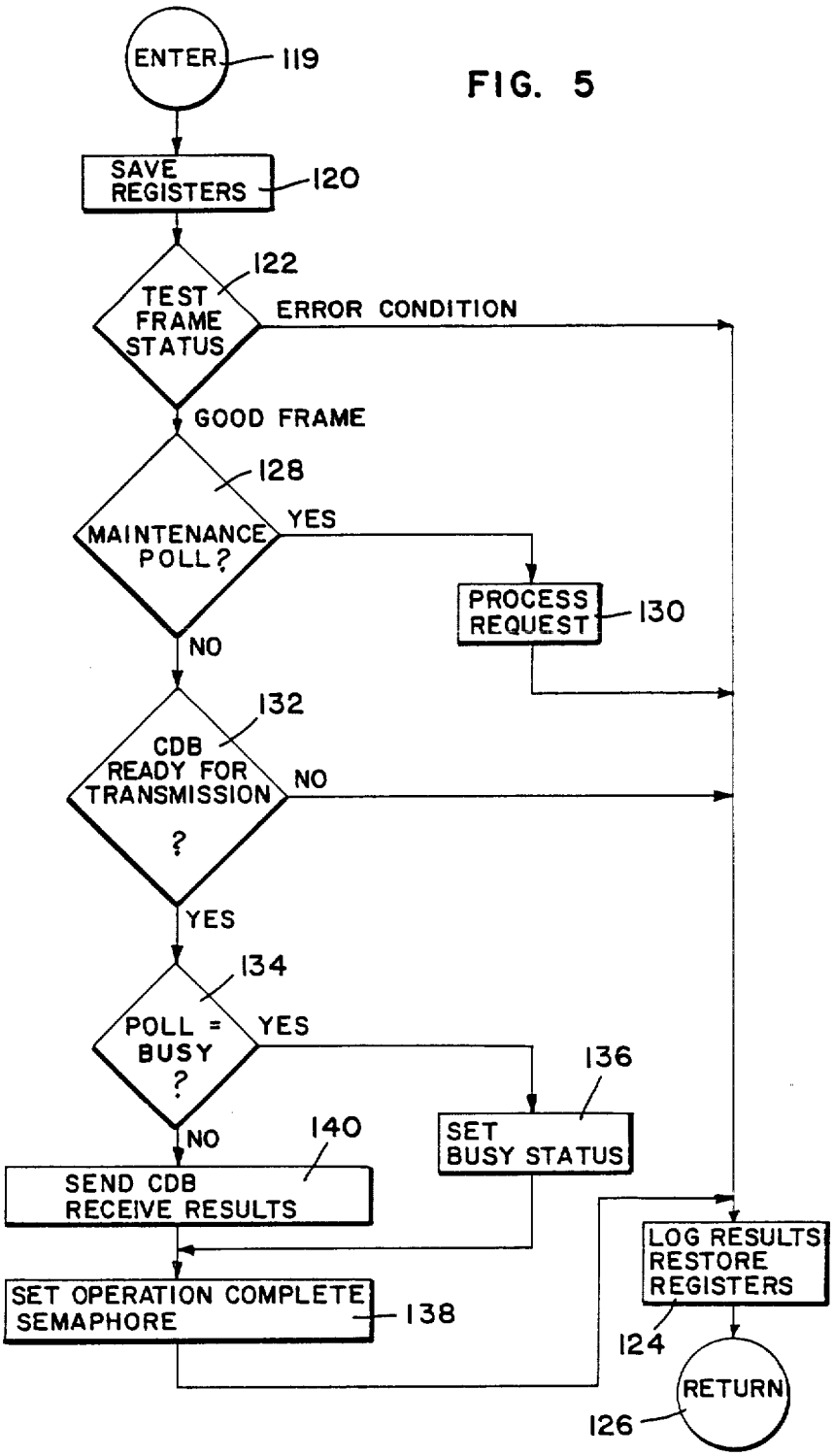
FIG. 5 is a flow diagram of the interrupt service routine logic of the intelligent high speed adaptor board embodiment shown in FIG. 2.

Illustrated in FIG. 5 is a logic flow diagram of the interrupt service routine of the intelligent high speed adaptor board 22. As illustrated at 119 and 120, the registers are saved when the interrupt service routine is first entered. At 122 the status of the frame check sequence which is transmitted with each serial transmission frame is checked to determine the integrity of the data transferred. If an error condition is detected then at 124 the results are logged and the registers restored before returning to the main program at 126. If the frame is determined to be error free, a check is made at 128 to determine whether a poll received is a maintenance poll such as an (are you there) poll transmitted to elicit a response from the receiving device to ensure an inoperative console (or networked up-line system controller board 30) does not cause resource reservations or locks to be left in effect if the equipment is no longer functioning. This might occur if there is accidental disconnection, inadvertent switching off of the device, etc. If a maintenance poll is detected at 128, the poll is processed at 130 and a response transmitted to the system controller board 30 if such is required. The results are once again logged at 124 prior to exiting to the main program at 126. If at 128 it was determined that a poll other than a maintenance (are you there) poll was received, then at 132 the interrupt service routine checks to see if a command descriptor block (CDB) is ready for transmission to the system controller board 30. If not the routine exits to the main program; however, if at 132 it is determined that a command descriptor block (CDB) is ready for transmission, the poll received is checked at 134 to ascertain whether it is a busy status poll. If a busy status has been received, at 136 the busy status flag is set and at 138 the operation complete semaphore is set and an exit performed to the main program. If at 134 it was determined that a busy status was not received, then at 140 the command descriptor block (CDB) data frame is transmitted and the intelligent high speed adaptor board 22 waits to receive the results from the system controller board 30. Upon receipt of the results data frame from the system controller board 30 in response to the CDB data frame transmission, the operation complete flag is set and an exit performed to the main program.

Figure 6:
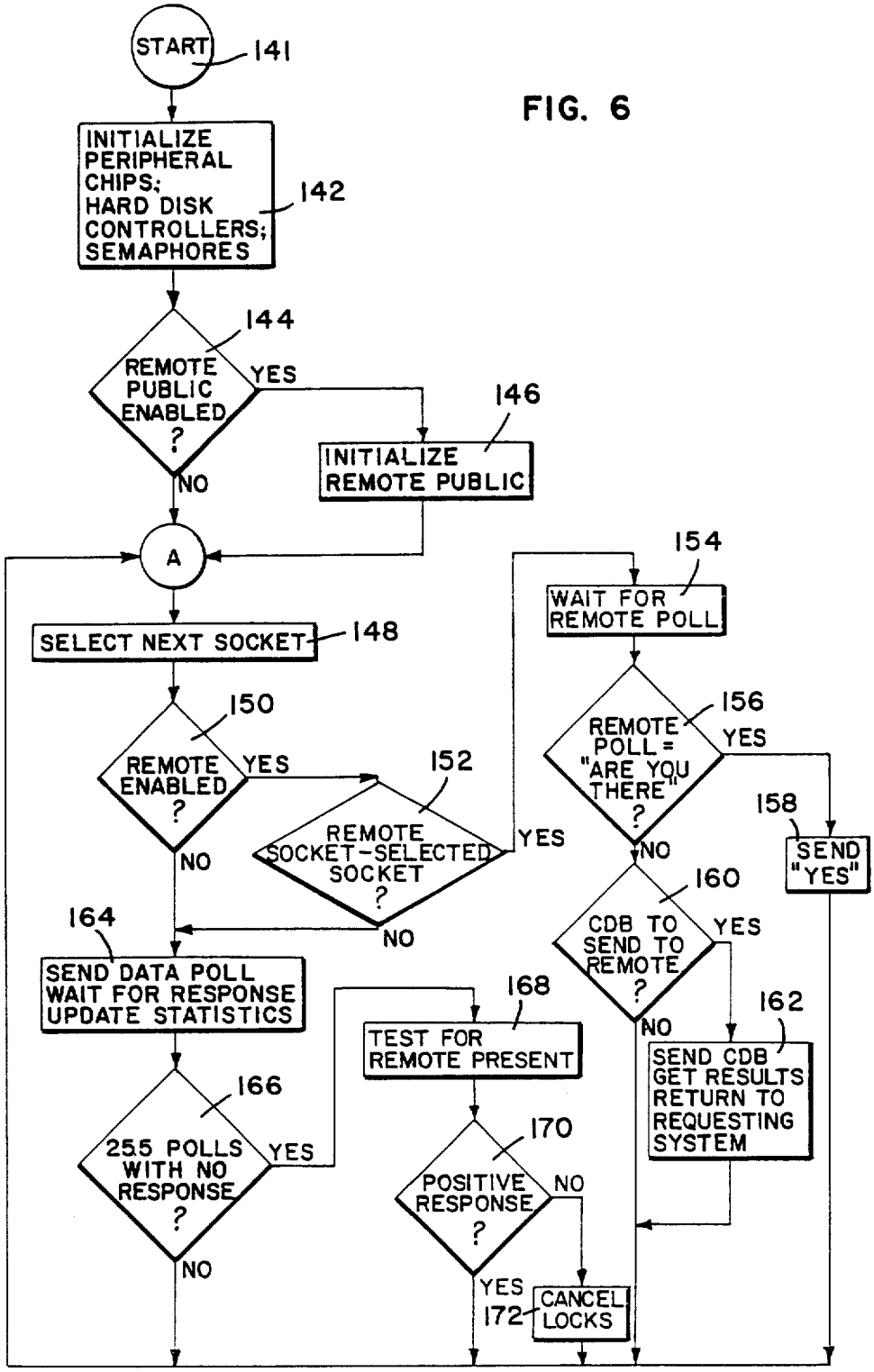
FIG. 6 is a logic flow diagram of the main logic loop of the system controller board embodiment shown in FIG. 3.

Illustrated in FIG. 6 is a block diagram of the logic flow for the basic idle loop in the system controller board 30. The system controller board logic performs three basic functions in the idle loop: (1) issues polls at each of the ports 52, waits an appropriate amount of time for a response (a command descriptor block (CDB) data frame), then goes on to the next port; (2) listens for maintenance (are you there) polls from downline systems which are present in a network situation and responds thereto; (3) sends maintenance (are you there) polls attempting to elicit responses from the user devices 24 or upline system controller boards 30 associated with each of the sockets or ports 54 to ensure than an inoperative console does not cause "locks" to be left in effect if that equipment is no longer functioning. Entry into the idle loop logic is at 141 with initialization of the chips, controllers, flags, etc., occurring at 142. At 144, the logic checks to ascertain whether a downline or remote public system controller board 30 is enabled. If such a down line system controller board 30 is enabled, an appropriate flag is set at 146. At 148, the next socket or port in sequence is selected and at 150 the logic checks to determine whether a remote system controller board 30 is enabled. If such a system is enabled, then at 152 a check is made to ascertain whether this is the socket to which the downline system controller board 30 is interconnected. If it is, then at 154 the logic waits for a remote poll from the down line system controller board 30. At 156 a check is made to ascertain whether a maintenance (are you there) poll has been received and, if such is received, at 158 an appropriate response is sent acknowledging receipt of the maintenance poll. If a maintenance poll was not received, at 160 the logic checks as to whether a command descriptor block (CDB) data frame is ready to be transmitted to the remote downline system controller board. If such a block is to be transmitted, then at 162 the command descriptor block is sent. Upon receiving the results from the down line system controller board 30, the results are returned to the user device 24 which originated the command descriptor block. If at 150, it was determined that the down line system controller board 30 was not interconnected to the port 54 being monitored, then at 64 a CDB data poll or non-maintenance poll is transmitted to the intelligent high speed adaptor board 22 interconnected to that particular port. The logic waits for a command descriptor block (CDB) data frame transmission from the intelligent high speed adaptor board 22 and in response thereto transmits back to the intelligent high speed adaptor board 22 results and statistics. If no response is received after predetermined period of time from the user device 24 being polled, at 166 a check is made to determined whether the user device 24 has been polled previously a predetermined number of times with no response. If no response has been received for a predetermined number of polls; for example, a time period of five to ten seconds, then at 168 the maintenance (are you there) poll is transmitted to determined whether the user device 24 is present. If at 170 a positive response is detected indicating the presence of a user device, the system controller board logic moves onto the next socket or port 54. If no positive response is received then at 172 all resource reservations or locks are canceled.

Figure 7:
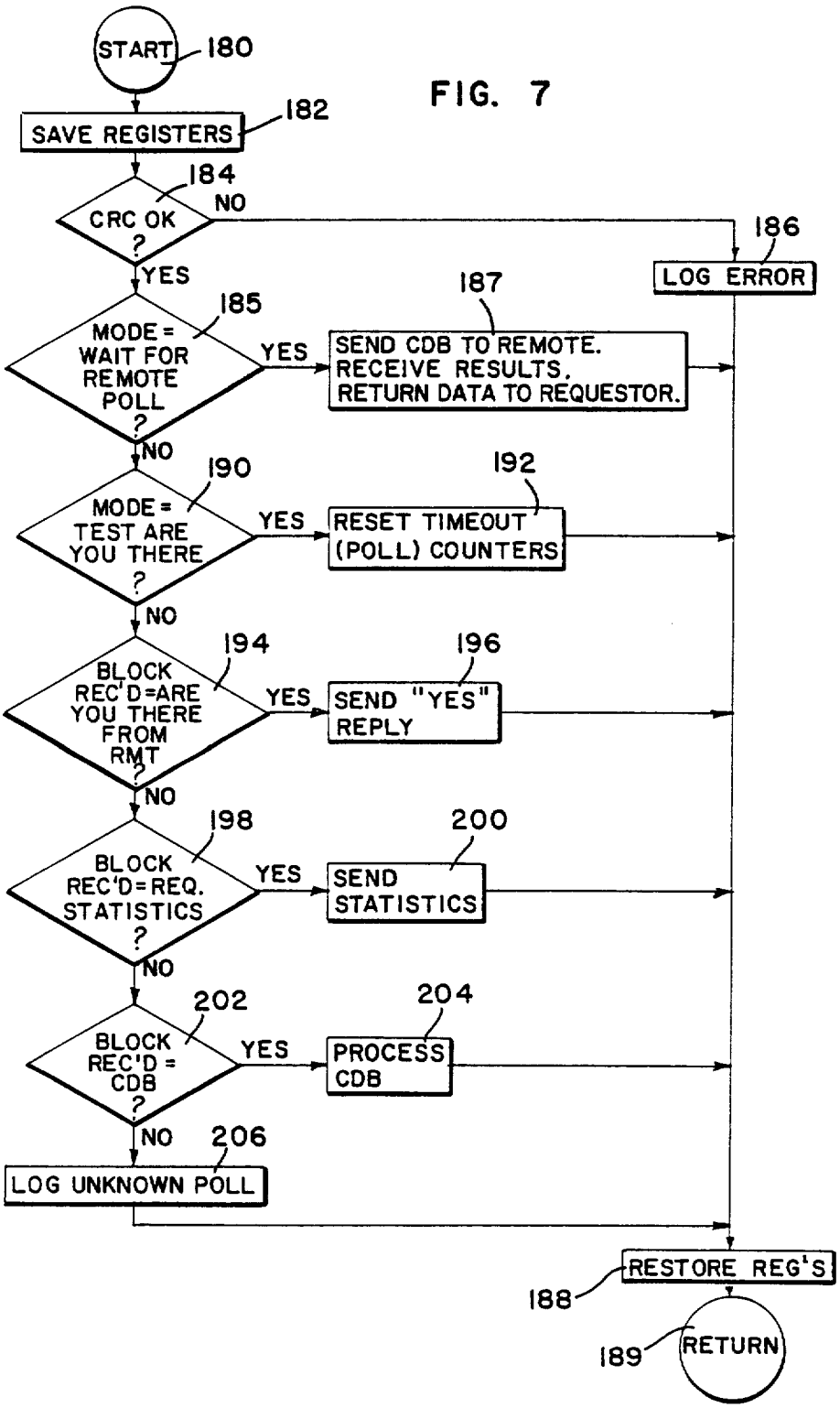
FIG. 7 is a flow diagram of the interrupt service routine logic of the system controller board embodiment shown in FIG. 3.

Illustrated in FIG. 7 is a block diagram of the interrupt service routine logic of the system controller board 30. Entrance to the routine is at 180. The routine performs preliminary housekeeping task such as saving registers when an interrupt is received as indicated at 182. At 184 a frame check or cyclic redundancy check is performed to ascertain if there was anything wrong with the frame transmission. If there was, at 186 error is recorded and the registers restored at 188 prior to returning to the main program. At 185 a check is made to ascertain whether system controller board was waiting for a poll from a down line system controller board 30 such as when in a networked mode. If the system controller board 30 was in this mode, then at 187 the system controller board 30 mimics the functionality of an intelligent high speed adaptor board 22 by using the socket designated as the link to downline systems in order to pass command descriptor block (CDB) data frames to the next system controller board 30 which itself may or may not pass this request onto another system controller board 30. At 190 a check is made to ascertain whether the system controller board 30 was waiting for a positive response to a maintenance (are you there) poll which was sent to the user device's intelligent high speed adaptor board interconnected to the polled socket to ascertain its presence If this was the mode of the system controller board 30, then at 192 the time out counters are reset. At 194 a check is made to ascertain whether the frame received from the downline system controller board 30 is a maintenance (are you there) poll If indeed this the case, then at 196 a yes reply is transmitted. At 198 a check is made as to whether a frame is received requesting statistics. If such a frame is received, then at 200 the statistics are transmitted to the requester. at 202 a check is made to ascertain whether a command descriptor block frame has been received. If such is the case, at 204 the command descriptor block (CDB) data frame is processed. If the poll is unrecognized, at 206 a status flag is set indicating that an unknown poll has been received.

Illustrated in FIG. 8 is a block diagram of the logic flow for the command descriptor block (CDB) data frame processing function 204. Entry to the routine is at 210. At 212 if it is determined that the controller field value is 0 the system controller board 30 will interpret the command and properly execute the command at 214. In the embodiment shown, the controller field is set to zero whenever a private or dedicated disk storage medium is utilized. Interpreting the command involves the process of evaluating a command to determine which device should execute the command. Executing the command involves the process of interpreting a command descriptor block and either executing it or transferring it to another device for execution via a parallel data bus. At 216 the results are serialized and returned to the intelligent high speed adaptor board 22. The results of the command descriptor block (CDB) processing are also logged at this time. For example, a statistic file might be kept to provide a running summary of the number and type of errors which have occurred, this information being available upon request to the user device. At 218 an exit is performed from the command descriptor block (CDB) processing. If the controller value was determined not be zero, at 220 a check is made as to whether a controller value is one or two. In the embodiment shown, the controller value of one or two relates to one of the shared or public high performance disk drives interconnected to the system controller board 30. At 222 a check is performed as to whether accessing of the disk drive via the parallel data bus is to occur. If the disk drive is to be written on or read from, at 224 the command is interpreted and the memory offset is computed prior to executing the command. If at 222 it is determined that an actual disk function is not to be performed but rather a management task such as reserving an area of the disk drive is to be performed, at 226 the management task is performed. At 228 a check is made as to whether the controller value is three, four, or five, which in the embodiment shown relates to a printer function. At 230 if it is determined that this is indeed a printer request, a check is made as to whether this is a management or functional request. If a functional request is being made then the command is interpreted and executed at 232. At 234 any management request is processed. At 236 a check is made as to whether the controller value is six. In the preferred embodiment this relates to diagnostic testing. If the controller value is six, at 238 the command is executed accordingly. If the controller value was not recognized, then at 240 an illegal controller status is issued.

In the preferred embodiment, the intelligent high speed adaptor board 22 is housed in the user device 24. It connects the user device 24 to the system controller board 30 and (if desired) simultaneously to a low performance peripheral devices associated with the user device 24. Circuitry to support both applications is present on the board.

The serial interface related functions includes:

1. Testing itself on power up.
2. Storing 16K bytes in dynamic RAM with automatic refresh control.
3. Transferring serial data at high speed (1 megabit/-sec) to or from the system controller board 30.
4. Transferring information with host user device memory via DMA.
5. Loading its own operating software from the shared resources.
6. Loading user device software from the shared resources if not available at the local disk drive.
7. Requesting extra sectors of information from system controller board 30 in look-ahead mode when operator requests read.

The intelligent high speed adaptor board power-up diagnostic consists of an initialization module and seven separate sub-tests, each designed to test a specific function or section of the board. Following initialization, each subtest is performed in sequence. Any errors occurring during a subtest causes an error value to be displayed on diagnostic LEDs:

Initialization: Initializes all devices on the board to a known state.

PROM Checksum: Verifies the correct data values of the PROM.

RAM Data: Reveals any pattern sensitive areas or dead memory bits within the random access memory.

RAM Address: Verifies the correct operation of all CPU address lines.

Counter Timer: Verifies the operation of the two channels on the Counter Timer Chip (CTC) which are used on the board as a timer and baud-rate generator. Each channel is timed against a software loop.

Non-Maskable Interrupt: This test verifies the operation of the third channel of the CTC. This channel is available to the board firmware and software as a watchdog timer and generates a non-maskable interrupt to the CPU when its count reaches zero.

Serial Input/Output: Verifies the ability of the Serial I/O device to transmit and receive a byte of data with the proper status and control signals.

DMA Test: Verifies the ability of the DMA controller device to transfer block of data to and from memory.

Switches on the intelligent high speed adaptor board 22 do not control any hardware function directly. Software, however, can read the switches. By this means some programs accept technician input.

The local resource related functions include:

1. Performs DMA transfers between memory and the local resource.
2. Reads status information from the local resource controller.
3. Generates and checks the host system data bus parity bit.

Data transfers between the host user device 24 and the local resource can be either interrupt or status driven. Status driven transfers are those in which the CPU sets up the DMA Controller and the Hard Disk Controller for the data read or record, and then repeatedly polls a status register on the intelligent high speed adaptor board for the indication that the task is complete.

Interrupt driven transfers are those in which the CPU attends to other tasks until the DMA transfer is complete. When the transfer is complete (typically one sector), the SASI Adapter notifies the CPU.

The intelligent high speed adaptor 22 preferably has a plug for an external diagnostic readout board. Open sockets for LEDs display numbers as programs (such as the Power-up self-tests) execute on the board. Proper operation is accompanied by changing LED numbers.

In the preferred embodiment, the system controller board 22 connects to all user devices and to all shared/-dedicated resources and performs the following functions:

1. Performs self-tests upon power-up, and then loads software from the disk drive resources.
2. If parity error is encountered, reboots software.
3. Polls the ports 54 to determine when a user device requires service.
4. Processes read commands from each use locates requested text on disk drive, directs the disk subsystem in fetching the information, and sends it to the requesting user device.
5. Processes write commands from each user device and writes information to the disk.
6. Controls all backup and restores operations.
7. Holds 64K bytes information in local memory.
8. Displays diagnostic information on the LEDs 52.

The system controller board 30 power-up diagnostic consists of an initialization module and eight sub-tests, each designed to test a specific function or section of the board. Following initialization, each sub-test is performed in sequence. Any errors encountered cause an error value to be displayed in the diagnostic LEDs.

Initialization: Initializes all devices on the board, including RAM, to a known state, initializes the diagnostic LEDs, and checks for the occurrence of a parity error. If a parity error has occurred, the test is simply restarted.

PROM Checksum: Verifies the correct data values of the PROM.

Move PROM to RAM: The system controller board 30 contains 64K bytes of RAM, of which the lower program must reside in the RAM. After the PROM data has been verified, the entire contents of the PROM are copied to the corresponding RAM address and the PROM is disabled. Program execution from this point occurs entirely from within the RAM.

RAM Data: Reveals any pattern sensitive areas or dead memory bits within the random access memory.

RAM Address: Checks for correct operation of all CPU address lines.

Counter Timer: Functionally verifies the operation of the two channels of the CTC which are used on the board as a timer and baud rate generator. Each channel is timed against a software loop.

Non-Maskable interrupt: Verifies the operation of the third channel of the CTC. This channel is available to the board firmware and software as a watchdog timer and generates a non-maskable interrupt to the CPU when its count reaches zero.

Serial Input/Output: Verifies the ability of the Serial I/O device to transmit and receive a byte of data with the proper status and control signals.

DMA Test: Confirms that the DMA Controller can transfer a block of data to the from memory. A 256-byte block of data is transferred from a RAM buffer to a second RAM buffer via the serial I/O device.

Switches of the system controller board 30 do not control any hardware function directly. Software, however, can read the switches. By this means some programs accept technician input.

There are two adjacent sockets on the system controller board 30 for the 7-segment LEDs. These LEDs display numbers as programs are executed during the power-up sequence and during system operation. Proper operation is accompanied by changing LED numbers. The remaining socket is for a single LED which will indicate which port is being serviced during program execution or system operation.

In operation, to record a page of text, the user device initiates the CDB command to record information onto the disk resource via the keyboard.

Software in the user device 24 verifies that the section is open and that the page label is legal. The user device CPU assembles a series of requests for data transmission to the system controller board 30. The requests pertain to raw data transfers to be performed and to shared resource management. Since these requests are for raw information, no conceptual knowledge of file systems or structures within the shared resource system is required. The requests are handed to the intelligent high speed adaptor board 22 which converts them from parallel to serial data. Each bit is converted into voltage differential signals for transmission on external cable to the system controller board 30. Receivers in the system controller board 30 convert the signals to logic voltage levels. The system controller board 30 collects the entire message and interprets it.

The logical allocation of storage on the disk resource is totally controlled by and dependent on the host components. The host computer in a typical embodiment uses three separate software structures:

1. Allocation Map
2. Directory Nodes
3. Text Pages

The allocation map keeps track of which sectors on the disk are available for new text, and which are already being used. The system starts using sectors lying near the outside edge of the disk, and as they get filled up, uses ones closer to the center. Text pages which are longer than 256 characters require more than one sector. In this case, the system keeps the page together by using continuous sectors. The second structure involved in the filing system is the directory node. The first directory node points to other directory nodes in the hierarchy, or tree arrangement. The subsequent nodes tell where a text page is stored on the disk, what the page label is, and whether it has a title line. The third structure in the filing system is the text itself. the text starts with the "start of text" marker, the page label, and the page description (the white-on-black-line at the top of the page on the screen).

The user device host computer processes the request to record as follows:

1. Directs the disk controller via the intelligent high speed adaptor board 22 and system controller board 30 to position the read/write heads over the portion of the disk that has the allocation map.
2. Hunts through allocation map to find enough continuous sectors and then modifies the allocation map.
3. Stores the first sector of text on the disk. The disk controller then writes an error correction code with the text.
4. Records additional sectors on disk until all the text is stored on disk in a manner similar to paragraph three above.
5. Rewrites the directory node to reference the new page.
6. Deletes any former version of the page.

Once the read/write heads have been moved, they read address information from the disk to confirm proper positioning. Magnetically recorded address information in the disk induces signals in one of the read/write heads. These signals are amplified by the hard disk drive read/write board, and transferred to the controller where the actual desired positions are compared.

If the information is recorded successfully on the disk, then the system controller board 30 sends an acknowledgment to the intelligent high speed adaptor bound 22 which in turn returns the acknowledgement to the user device 24. If it is not correct, or if it is not successful, the transfer attempt is repeated by the host device until successful or the sector is declared faulty. Software in the host device makes a record of the bad sector in an error directory on the disk, and writes the text to another sector.

The sole responsibility of the shared resource system is to transfer the requests and results thereof to and from the hard disk controller and provide basic data management and allocation functions. The file system and its structure are maintained by the host computer systems. In this fashion, host computers having different filing systems may use the shared resource system without interference.

Just as occurs during a record function, the operator at the user device 24 initiates the (CDB) command to read a particular page from the disk. The user devices CPU interprets the command to read a particular page from the disk, creates a series of low level requests, sends the requests to the intelligent high speed adaptor board 22, and the intelligent high speed adaptor board 22 requests the system controller board 30 to read the information.

The disk reads the information and transfers it to the disk controller. The ECC is examined, and data up to 11 bits is corrected, if necessary. Data and clock bits (MFM Data) are separated by the disk controller. Once all the information in this sector is successfully transferred to the disk controller, the system controller board 30 fetches it, converts it to serial format, and transmits it to the intelligent high speed adaptor board 22 in the user device. The intelligent high speed adaptor board 22 transfers information from its memory to the user device host computer via DMA, making the read from disk process appear extremely fast.

Due to the amount of storage often available at the shared resource disk drive, typically a fixed disk drive, plus the speed of its communications present the opportunity of storing the word or data processing user device software there.

Storing software on the shared resource hard disk might be accomplished by means of a special utility. After the software has been written to the disk, the user device can load its software either from a local resource; e.g. a floppy disk or the remote fixed disk drive.

If no floppy disk is in the local disk drive, the program might request loading from the remote fixed disk drive.

Because the system controller board 30 and the intelligent high speed adaptor board 22 are intelligent devices, the system controller board 30 and the intelligent high speed adaptor board 22 also require programs to direct their activities. When the system is powered up and the fixed disk drives become ready, the system control board 30 fetches its operating instructions from a storage area on the hard disk. When a connected user device is powered up, its intelligent high speed adaptor board 22 also will fetch its operating instructions from the fixed disk drive.

In the preferred embodiment the users can create a backup copy of their portion of the disk to reduce the amount of data lost if the system should fail. In the backup process, the operator requests the special backup utility from the keyboard. The console software assembles the proper request, transfers it to the intelligent high speed adaptor board 22, and the intelligent high speed adaptor board 22 transmits it to the system controller board 30 in the central system. After the operator inserts the backup disk, the system controller board 30 sets up the necessary commands for the disk controller in the cartridge or removable media drive. Data is read in from the fixed drive via the fixed disk controller and moved by DMA to the system controller board 30. From there the data is moved by DMA to the removable drive, and written to the disk.

Restoring data from the removable media disk to the hard disk also requires a utility request. The restoration process is the reverse of backup. Image backup and restoration are the only operations which require the removable media drive to be installed.

It is to be understood however, that even though numerous characteristics and advantages of the invention have been set forth in the foregoing description, together with details of the structure and function of the invention, the disclosure is illustrative only, and changes may be made in detail, especially in matters of shape, size and arrangement of parts within the principles of the invention, to the full extent indicated with a broad general meaning of the terms in which the appended claims are expressed.

What is claimed is:

1. A shared resource system for sharing at least one or more remote high performance peripheral devices such as a fixed disk drive, the shared resource system comprising:

(a) a plurality of intelligent user devices including processor means for word processing and data processing;

(b) a high speed serial synchronous data link interconnecting the remote high performance peripheral devices to each of the user devices;

(c) a unique intelligent high speed adaptor board means electrically interconnected to each of the user device for receiving via parallel interface bus means requests to use any one of the high performance peripheral devices originated at the user devices and transmitting the requests on the serial synchronous data link such that each of the user devices is interconnected to its own unique intelligent high speed adaptor board means;

(d) a system controller board means electrically interconnected to the high performance peripheral devices of the shared resource system for receiving the requests transmitted on the high speed serial synchronous data link by the intelligent high speed adaptor board means and transmitting the requests to the high performance peripheral device via parallel interface bus means, the system controller board means being interconnected to a plurality of the intelligent high speed adaptor board means by a plurality of ports, the system controller board means further including polling means for periodically polling each of the ports to ascertain whether the intelligent high speed adaptor board means electrically interconnected to the respective port being polled has any requests for any of the high performance peripheral devices, the system controller board means including switch means for switching to the high performance peripheral device requested, the system controller board further including means for receiving the results of any operations performed at the high performance peripheral devices and transmitting the results so as received on the high speed serial synchronous data link to the intelligent high speed adaptor board means making the request; and (e) the intelligent high speed adaptor board means including means for receiving the results transmitted on the high speed serial synchronous data link and for transmitting the results so received to the user devices via the parallel interface, whereby multiple user device such as word processing and data processing devices can operate with shared or dedicated high performance peripheral devices without substantial modifications.

2. A shared resource system in accordance with claim 1, wherein the polling means for periodically polling includes means for monitoring each of the pores for a predetermined period of time until a request is received from the respective intelligent high speed adaptor board means, if no such request is received within the predetermined period of time, the next port in sequence is polled and monitored the predetermined period of time for response.

3. A shared resource system in accordance with claim 2, including means for ascertaining whether a particular port has an intelligent high speed adaptor board means electrically interconnected thereto by transmission of a maintenance poll requesting a response from the intelligent high speed adaptor board means.

4. A shared resource system in accordance with claim 1, wherein said shared resource system includes means for enabling access of both private and shared portions of a high performance disk device.

5. A shared resource system in accordance with claim 1, wherein the share resource system includes means for enabling user devices to reserve and use a remote high performance printer device.

6. A shared resource system in accordance with claim 1, further including means for allowing in a second system controller board means to be interconnected via a high speed serial synchronous data link to one of the ports of the system controller board means.

7. A shared resource system in accordance with claim 6, wherein the second system controller board means includes means for transmitting requests from user devices with which it is interconnected to the system controller board means to which the second system controller board means is interconnected.

8. A shared resource system in accordance with claim 6, wherein the second system controller board means polls the system controller board means to which it is interconnected to ascertain whether there are any requests from the system controller board means for the second system controller board means to process.

9. A shared resource system in accordance with claim 1, wherein the polling means includes means for transmitting messages to the intelligent high speed adaptor board means.

10. A system enabling a resource device such as a fixed disc drive or the like to be utilized by a plurality of user devices having localized intelligence such as word processing terminals or the like, a system comprising:

(a) parallel to serial and serial to parallel first converter means interconnected to each of the user devices by first parallel data bus means for receiving command descriptor block (CDB) commands from the user device via the first parallel data bus, the first converter means including means for formatting a command descript block (CDB) data frame in response to receipt of the CDB from the user device, the CDB data frame including a resource device identifier field, a data frame identifier field, and a CDB command field, the first converter means further including means for converting the CDB data frame to a serial protocol for transmission on a high speed synchronous serial data link;

(b) parallel to serial and serial to parallel second converter means interconnected to the resource device by second parallel data bus means for receiving the CDB data frame transmitted from the first converter means and for converting the CDB command included therein to a parallel protocol for transmission to the resource device on the second parallel data bus means;

(c) high speed synchronous serial data link means for interconnecting each of the first converter means to the second converter means, the second converter means including multiple port means for enabling interconnection of the high speed synchronous serial data link means to the second converter means, the second converter means further including means for periodically individually polling each of the port means, CDB data frame transmission from the other first converter means being disabled when a particular first converter means is being polled, the first converter means being so polled including means for transmitting a CDB data frame upon being polled if it has any such CDB data frame to transmit;

(d) the second converter means including means for transmitting a results data frame to the first converter means being polled as a result of operations performed at the shared resource device in response to the CDB data frame received from the first converter means being polled; and (e) the first converter means including means for receiving on the high speed synchronous serial data link means the results data frame and transmitting information contained therein to its associated user device via the first parallel data bus.

11. A method whereby multiple user devices having localized intelligence such as data or word processing terminals, share a resource device such a disk drive, comprising the steps of:

(a) independently originating at one of the intelligent user devices a request to access the shared resource device;

(b) each of the user devices transmitting the request so originated via a parallel data bus to first serial to parallel and parallel to serial converter means electrically interconnected to the user device for converting the request to a serial data transmission protocol;

(c) periodically and individually polling each of the first converter means by a second serial to parallel and parallel to serial converter means to ascertain whether any such request is present;

(d) transmitting the request on a high speed synchronous serial data link from the first converter means only upon being polled by the second converter means;

(e) receiving the request so transmitted at the second converter means;

(f) converting the request at the second converter means to a parallel data transmission protocol and transmitting as such to the shared resource device via a parallel data bus;

(g) receiving the results at the second converter means via the parallel data bus of any operations performed at the shared resource device as a result of the request;

(h) converting the results to a serial data transmission protocol and transmitting the results from the second converter means to the first converter means on the high speed synchronous serial data link which transmitted the request prior to polling any of the other user devices by the second converter means; and (i) converting the results received on the high speed synchronous data link at the first converter means to a parallel data transmission protocol and transmitting the results to the user device on the parallel data bus.

12. A system enabling a resource device such as a fixed disk drive or the like to be utilized by multiple user devices such as word processing terminals or the like, the system comprising:

(a) a plurality of intelligent devices including processor means for word processing and data processing;

(b) an unique intelligent high speed adaptor board means electrically interconnected to each of the user devices for receiving via parallel interface bus means requests to use any one of a plurality of peripheral devices having higher performance characteristics than said intelligent user devices, said requests originating at the user devices, and for transmitting the requests from the intelligent high speed adaptor board means on a serial synchronous data link such that each of the user devices is interconnected to its own unique intelligent high speed adaptor board means;

(c) said unique intelligent high speed adaptor board means further including a first parallel data bus means for receiving command descriptor block commands from the corresponding intelligent user device via the first parallel data bus, and means for formatting a command descriptor block data frame in response to receipt of the command from the corresponding intelligent user device, said command descriptor block data frame including a resource device identifier field, a data frame identifier field, and a command descriptor block command field, and further including means for converting the command descriptor block data frame to a serial protocol for transmission on a high speed serial synchronous data link;

(d) a system controller board means including parallel-to-serial and serial-to-parallel second converter means interconnected to the high performance resource device by a second parallel data bus means for receiving the command descriptor block data frame transmitted from the intelligent high speed adaptor board means and for converting the command descriptor block command included therein to a parallel protocol for transmission to the high performance resource device on the second parallel data bus means; interconnecting (e) high speed synchronous data link means for each of the intelligent high speed adaptor board means to the system controller board means; including (f) the system controller board means multiple port means for enabling interconnection of the high speed synchronous serial data link means to the system controller board means, the system controller board means further including means for periodically, individually polling each of the port means, to ascertain whether the intelligent high speed adaptor means electrically interconnected to an intelligent suer device and electrically interconnected to the respective port being polled has any requests for any of the high performance peripheral devices, the command descriptor block data frame transmission from other intelligent high speed adaptor board means being disabled when a particular first intelligent high speed adaptor board means is being polled, the intelligent high speed adaptor board means so polled including means for transmitting a command descriptor block data frame upon being polled if it has any such command descriptor block data frame to transmit, the high speed synchronous serial data link means further including switch means for switching to the high performance peripheral device requested, receiving means for receiving the results of any operations performed at the high performance peripheral devices, and transmitting means for transmitting the results so received on the high speed serial synchronous data link to the intelligent high speed adaptor board means making the requests;

(g) the system controller board means further including means for transmitting a results data frame to the intelligent high speed adaptor board means being polled as a result of operations performed at the high performance peripheral device in response to the command descriptor block data frame received from the intelligent high speed adaptor board means being polled;

(h) the intelligent speed adaptor board means further including means for receiving on the high speed synchronous serial data link means the results data frame and transmitting information contained therein to its associated user device via the first parallel data bus, whereby multiple user devices such as word processing and data processing devices can operate with shared or dedicated high performance peripheral devices without substantial modifications.

13. A system in accordance with claim 12, wherein polling means for periodically polling includes means for monitoring each of the ports for a predetermined period of time until a request is received from the respective intelligent high speed adaptor board means, such that if no such request is received within the predetermined period of time, the next port in sequence is polled and monitored the predetermined period of time for a response.

14. A system in accordance with claim 13, further including means for ascertaining whether a particular port has an intelligent high speed adaptor board means electrically interconnected thereto by transmission of a maintenance poll requesting a response from the intelligent high speed adaptor board means.

* * * * *